United States Patent [19]

Kalwar

[11] Patent Number: 5,439,548
[45] Date of Patent: Aug. 8, 1995

[54] APPARATUS FOR AND METHOD OF RESTORING A DAMAGED COATING OF A DRUM

[76] Inventor: Klaus Kalwar, Alte Landwehr 10, 33803 Steinhagen, Germany

[21] Appl. No.: 194,175

[22] Filed: Feb. 9, 1994

[30] Foreign Application Priority Data

Feb. 10, 1993 [DE] Germany ............... 93 01 808 U

[51] Int. Cl.6 ............................................. B32B 31/00
[52] U.S. Cl. .................. 156/350; 156/272.6; 156/389; 156/379.6
[58] Field of Search ............... 156/379.6, 350, 389, 156/94, 98, 272.6, 273.3, 273.5, 307.1, 307.7

Primary Examiner—Chester T. Barry
Attorney, Agent, or Firm—Henry M. Feiereisen

[57] ABSTRACT

Apparatus for and method of restoring a damaged area of a coating on a drum body includes a treatment station with a coating-removal unit which initially mechanically frees the damaged area from remaining coating. After cleaning the freed damaged area, a patch is inserted and united with neighboring coating material through hot vulcanization or hot pressing for bonding to the drum body, with the patch having a material composition corresponding to the coating material. Finally after curing, the thus-restored area is surface finished to match the restored coating to the dimension and surface finish of the remaining coating of the drum body.

13 Claims, 3 Drawing Sheets

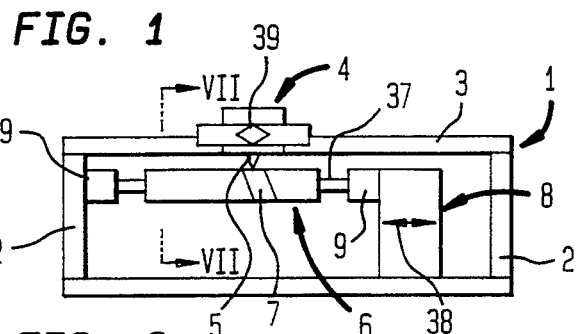
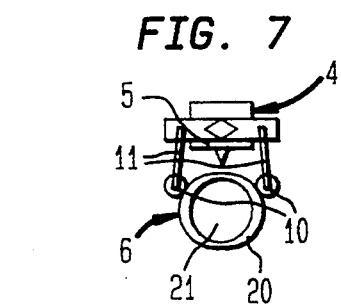
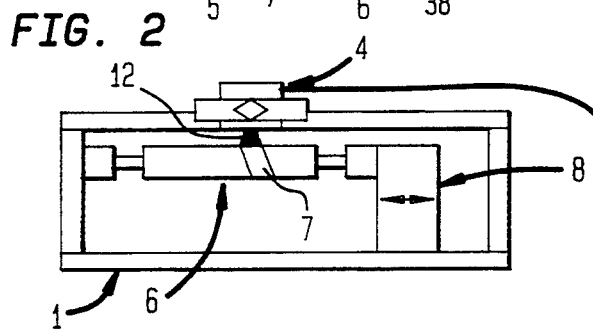
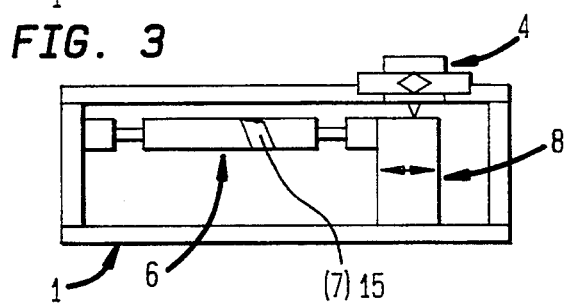
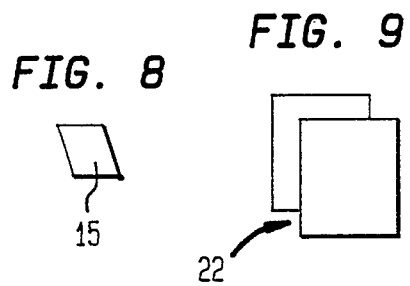
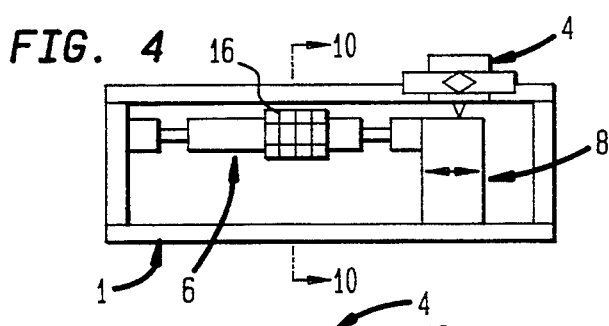
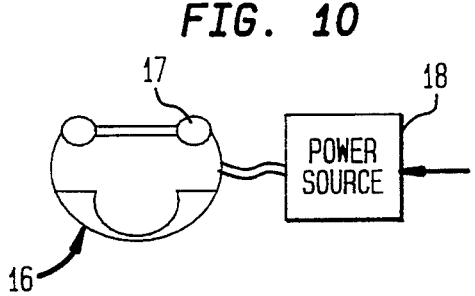
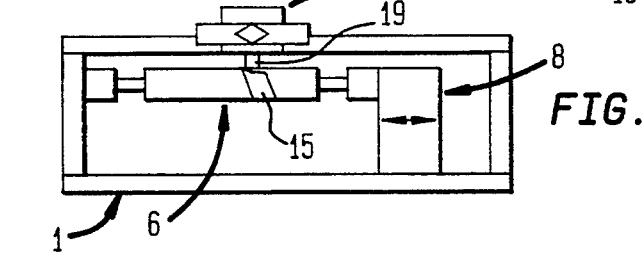
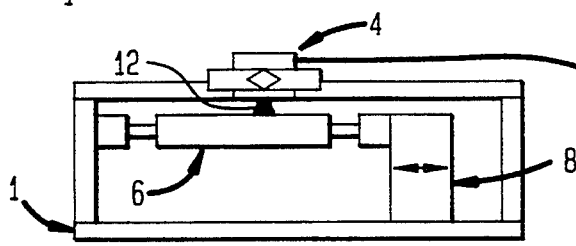

APPARATUS FOR AND METHOD OF RESTORING A DAMAGED COATING OF A DRUM

BACKGROUND OF THE INVENTION

The present invention refers to an apparatus for and method of restoring a damaged area of a coating of a drum, with the coating applied through hot vulcanization and the damaged area being essentially filled by a patch which is connectable to the drum body.

Such drums with a coating usually made of rubber is widely used. During operation, the coating progressively wears off so that the drum has to be re-coated after a certain period. This requires a detachment of the drum from the respective machine.

Apart from such progressive wear, the coating may also become only partially damaged. Such partially damaged areas could theoretically be patched up without necessitating a complete re-coating of the drum because despite such locally damaged areas, the overall performance of the drum could still meet the requirements.

It is known to mend damaged areas through insertion of a patch and to connect the patch with the drum body through cold vulcanization. However, the surface finish of the drum body remains unsatisfactory after such repair, thus adversely affecting the quality of a material web transported through the drum. A reason for that resides in the different material composition of the patch which is applied through cold bonding or cold vulcanization, on the one hand, and the original coating which is bonded with the drum body through hot vulcanization, on the other hand.

Especially in drum electrodes which are part of an arrangement for corona treatment and perform a corona discharge on advancing material webs, 8 the quality of the material web surface is considerably reduced because the different application of the patch and the coating will result in an uneven corona discharge.

In order to avoid these problems, the occurrence of damaged coating areas generally requires a complete replacement of the drums and subsequently a complete re-coating thereof. This, however, is very uneconomic. In particular a replacement of drums in sheet stretching plants or of drums used in the paper industry is very time consuming and complicated because of the considerable size and weight of such drums.

SUMMARY OF THE INVENTION

It is thus an object of the present invention to provide an improved apparatus and improved method for restoring a damaged coating area of a drum, obviating the afore-stated drawbacks.

In particular, it is an object of the present invention to provide an improved apparatus and improved method for restoring a damaged coating area of a drum by which the drum coating can be locally repaired in a very economical manner without experiencing a deterioration in quality of the overall surface.

These objects and others which will become apparent hereinafter are attained in accordance with the present invention by providing a treatment station which includes a coating-removal unit for mechanically freeing the damaged area from remaining coating, a cleaning unit for cleaning the freed damaged area, a bonding unit for uniting a patch inserted in the damaged area with neighboring coating material through hot vulcanization or hot pressing, with the patch having a material composition corresponding to the coating material, and a finishing unit for mechanically surface finishing the restored coating area.

Through provision of such an apparatus, a damaged area of the coating can be locally patched up and restored to equal the remaining coating with regard to behavior toward stress as well as quality.

In principal, the patch is applied onto the drum body in a same manner as the original coating. By hot vulcanizing the patch, there is no necessity to use adhesives or other like materials which display a different behavior during stress compared to the remaining coating on the drum body.

The mechanical treatment of the damaged area for removing remaining coating in this area can be achieved through grinding, milling or other treatment processes. Cold cleaners may be usable for cleaning the thus freed damaged area. However, it is preferred to use a corona discharge for cleaning because the corona discharge creates on the drum body bonding zones which positively affect the vulcanization and cause a much improved bonding of the patch with the drum body.

Through the provision of the novel and inventive apparatus and method, the surface finish of the restored area is equivalent to the surface finish of a completely new coating of the drum body, however the results are achieved at greatly improved efficiency in comparison to the state of the art, especially when considering the heavy drums which are utilized in sheet stretching plants or in the paper industry and now can be repaired on site without requiring a dismantling of the drums.

According to another feature of the present invention, the treatment station is integrated in a treatment plant for corona treatment of a material web. In this manner, a damaged area of the coating on the drum body can be repaired and mended instantly, with the entire repair process including mechanical removal of coating from the damaged area, cleaning of the freed area, hot vulcanizing of the patch inserted in the freed area, subsequent mechanical surface finishing treatment and final corona treatment for matching the adhesion behavior of the patch to the neighboring zone, being carried out by means of a computerized and programmable control unit. Suitably, the parameters for mending the damaged coating are stored in the control unit and best suited for each treatment plant.

The corona electrode which effectuates the cleaning of the freed area and the corona treatment of the restored drum coating may be connected to a generator of the treatment plant to further reduce manufacturing costs of the apparatus.

Preferably, the hot vulcanization of the patch being applied is carried out by a heatable collar which encloses the drum body in the area of the patch.

Advantageously, the patch has dimensions which slightly exceed the outer dimensions of the damaged area so that the patch can be squeezed in the area being restored to create an intimate bonding with the adjoining original coating during the subsequent hot vulcanization. Resulting material accumulations along the edges can be removed through the subsequent surface finishing, e.g. through milling, grinding or the like to achieve an overall uniform diameter of the drum.

Besides integrating a treatment station in a treatment plant for corona treatment of a material web, it is also conceivable to provide such a treatment station in other treatment plants or in machines equipped with drums, such as e.g. printing machines, presses, machines for paper production or the like, with each drum being suitably associated with a treatment station. However, it is also possible to install a treatment station for several drums which can then be shifted from one drum to another drum.

Preferably, all operating elements such as drive and other like units which are required for running the treatment plant are also used for operating the treatment station.

By using an appropriate software for the computerized control unit, the operation of the treatment plant and of the treatment station can be best suited and synchronized, i.e. as soon as a damaged coating area is recognized, the repair is automatically initiated without any delay and without any input of personnel to restore the damaged coating area. This renders the apparatus very economical and efficient especially when utilizing the treatment station as an integral part of a treatment plant which generally has significant operating expenses.

Instead of using rubber or the like as coating material which is applied through hot vulcanization, the coating for the drum may also be of a ceramic compound which is applied in form of a paste-like consistency and treated in a manner as described above. The ceramic compound is cured through hot-pressing by applying pressure and heat simultaneously at sufficiently high temperatures, before carrying out the final surface finishing of the restored area.

BRIEF DESCRIPTION OF THE DRAWING

The above and other objects, features and advantages of the present invention will now be described in more detail with reference to the accompanying drawing in which:

FIGS. 1, 2, 3, 4, 5 and 6 illustrate schematic end views of an apparatus for restoring a damaged coating area of a drum body, illustrating in detail the steps for making the improved restoration process according to the present invention;

FIG. 7 is a schematic sectional view of the apparatus taken along the line VII—VII in FIG. 1;

FIGS. 8 and 9 are schematic illustrations of a starting material for a patch for application onto the drum body;

FIG. 10 is a schematic sectional view of the apparatus taken along the line X—X in FIG. 4;

DETAILED DESCRIPTION OF PREFERRED EMBODIMENTS

Figure 11:
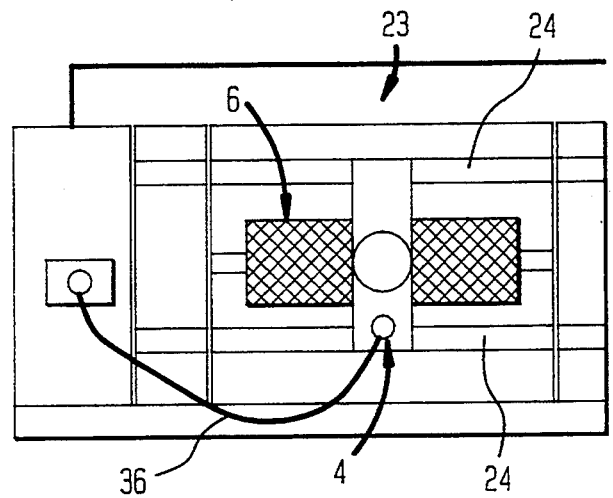
FIG. 11 is a schematic simplified end view of another embodiment of an apparatus for restoring a damaged coating area of a drum body in accordance with the present invention.

Throughout all the Figures, the same or corresponding elements are indicated by the same reference numerals.

Referring now to the drawing, and in particular to FIGS. 1 to 6, there are shown schematic end views of an apparatus for restoring a damaged area 7 of a coating 20 applied on the drum body 21 (FIG. 7) of a drum 6 through hot vulcanization, and illustrating in detail the steps for making the improved restoring process according to the present invention. The apparatus includes a frame 1 of substantially rectangular configuration with two side parts 2 which are joined together by a crosshead 3. The drum 6 rotates on a shaft 37 having axial ends received in bearings 9 of a bearing unit 8 which is supported by the frame 1. As indicated by double arrow 38, the bearing unit 8 is shiftable for movement in axial direction of the drum 6. Mounted to the crosshead 3 above the drum 6 is a treatment station, generally designated by reference numeral 4 which, as indicated by double arrow 39, is also shiftable in axial direction of the drum 6. The treatment station 4 includes a tool 5, e.g. a milling tool or a grinding tool, which is movable in a direction transversely to the shaft 37 of the drum 6.

As indicated in FIG. 1, once a damaged area 7 of the coating 20 is detected or recognized on the drum body 21 the repair is initiated by operating the tool 5 of the treatment station 4 for removing remaining coating material in the damaged area 7, with the vertical and/or horizontal movement of the tool 5 and of the treatment station 4 allowing a precise machining of the damaged area 7 so that residues of the coating which are still present are completely removed from the damaged area 7 in a precise manner so that the damaged area 7 has exactly defined contours. In most cases, the coating 20 is of rubber. However, other suitable materials such as ceramic compounds may also be used and applied onto the drum body 21 through hot vulcanization or hot pressing.

After being freed from remaining coating material, the exposed damaged area 7 is cleaned as shown in FIG. 2. The cleaning step is performed by means of a corona discharge, generated through a corona electrode 12 which is retained in the treatment station 4 and connected via a conductor cable 14 with a generator 13 for supply of high voltage. Apart from accomplishing a suitable cleaning effect, the corona discharge creates bonding nests in the base of the damaged area 7 by which the adhesion of a patch 15 being inserted subsequently is considerably improved.

It will be understood by persons skilled in the art that even though the application of a corona discharge for cleaning purposes is a preferred cleaning method, it may be substituted by other suitable cleaning methods, such as e.g. through use of cold cleaners.

As shown in FIG. 3, the patch 15 which is inserted in the damaged area 7 is made from a rubber sheet 22 shown in FIG. 9 and is cut to substantially conform to the contour of the damaged area 7. Preferably, the patch 15 has dimensions which slightly exceed the outer dimensions of the damaged area 7 so that the patch 15 can be squeezed in the damaged area to effectuate an intimate bonding with the adjoining original coating 20 during the subsequent hot vulcanization.

The hot vulcanization of the patch 15 is shown in FIG. 4 and is attained by means of a heating collar or jacket 16 which is placed in the area of the patch 15 around the drum 6 and tightly secured by a clamp 17. The heating collar 16 is connected to a power source 10 (FIG. 10) to raise the temperature of the collar 16 to the vulcanization temperature.

Following the hot vulcanization is a further mechanical machining step by means of a tool 19 as shown in FIG. 5. In the nonlimiting example of the FIG. 5, the tool 19 is a grinding tool which is mounted in the treatment station 4 and enables a surface finishing of the patch 15 to conform with neighboring coating material and to accomplish a uniform quality. Possible material accumulations created during insertion of the patch 15 along its edges are also removed by this grinding tool 19 to achieve an overall uniform diameter of the drum body 21.

Under certain circumstances, it may be suitable to subject the restored area of the drum 6 to a corona treatment which is carried out by the same corona electrode 12 used for cleaning the damaged area 7, as shown in FIG. 6. In this manner, same conditions with regard to surface adhesion will be created between the original coating 20 of the drum 6 i.e. the used rubber coating, and the new rubber coating formed by the patch 15.

As shown in FIG. 7, the treatment station 4 may be mounted on support posts 11 which carry support rollers 10 on their axial ends for support on the drum body 21 of the drum 6.

The apparatus described with reference to FIGS. 1 to 6 for restoring a damaged coating area 7 essentially is suitable for repairing drums which are detached from the pertaining machine and placed in the treatment station 4. However, it is certainly feasible to mend or repair a damaged drum 6 also on site by simply mounting the treatment station 4 in a manner as shown in FIG. 7 onto the drum 6 to thereby eliminate the necessity of removing the drum from the pertaining machine. This is especially advantageous for repair of large and heavy drums.

Turning now to FIG. 11, there is shown an end view of a treatment station 4 integrated in a treatment plant, generally designated by reference numeral 23 for corona treatment of a material web 25 which is conducted via guide rollers 26 about the drum 6. The corona treatment is carried out by an electrode 27 which is connected to a generator 28 for producing a high voltage, with the coating 20 of the drum 6 forming the dielectric to effectuate together with the electrode 27 the corona treatment.

The treatment station 4 is guided on stationary bars 24 of the treatment plant 23 for displacement in direction of the longitudinal axis of the drum 6, with the travel of displacement extending at least across the entire length of the coating 20.

Figure 12:
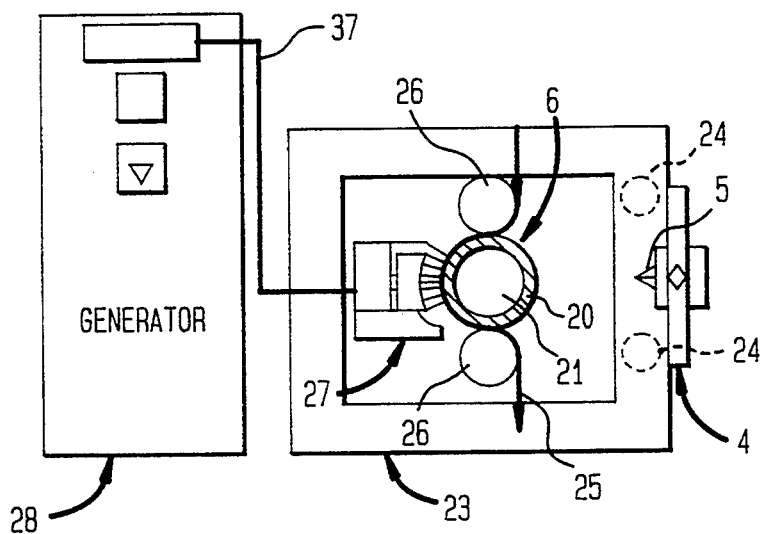
FIGS. 12 and 13 are schematic simplified side views of the apparatus of FIG. 11 in two different operating positions.
Figure 13:
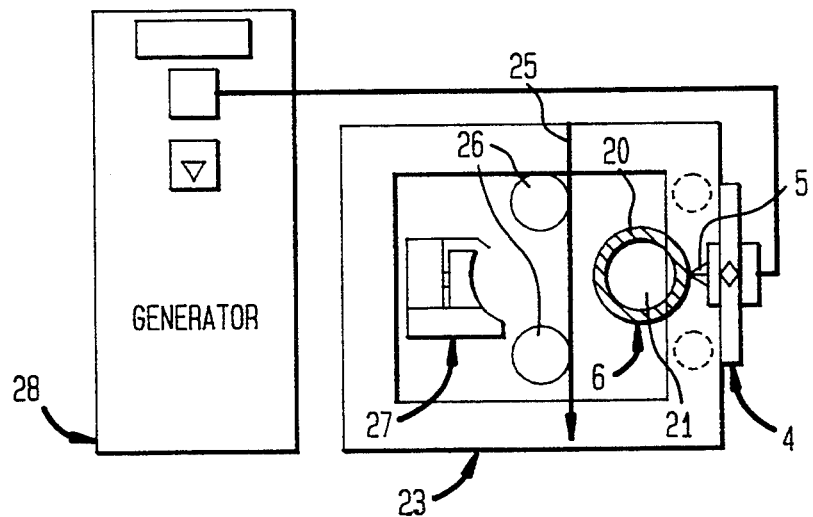

FIG. 12 illustrates the treatment plant in a position in which the material web 25 is subjected to a corona treatment, with the treatment station 4 being disengaged. FIG. 13 shows the treatment plant in a position in which the electrode 27 is disengaged while the treatment station 4 is used for restoring a damaged area of the coating 20 of the drum 6. Suitably, the treatment station 4 is supplied with power by the power supply for the treatment plant 23, e.g. via cable 36.

The corona electrode 12 of the treatment station 4, which is not shown in FIGS. 11 to 13 for sake of simplicity, is connected to the generator 28 so that the electrode 27 as well as the corona electrode 12 of the treatment station 4 are supplied with power from the generator 28.

The treatment of the damaged drum 6 can be optimized by a computerized control unit which e.g. may control the hot vulcanization so as to best suit the parameters—time, pressure and temperature—to prevailing conditions.

Figure 14:
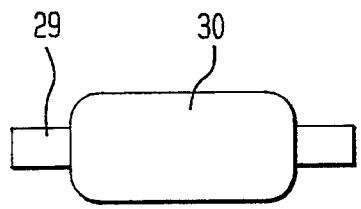
FIGS. 14, 15, and 16 are schematic simplified end views of roller elements for use in the apparatus according to the present invention.
Figure 15:
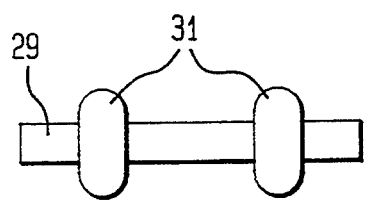
Figure 16:
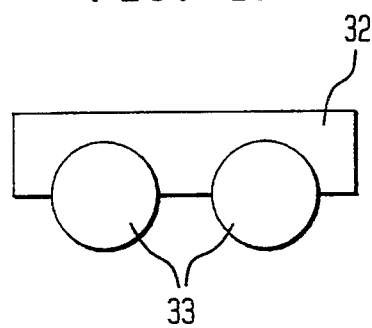
Figure 17:
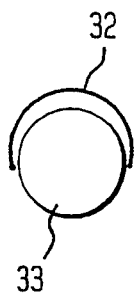
FIG. 17 is a schematic simplified side view of a roller element in form of a sphere.

As stated above with reference to FIG. 7, the treatment station 4 is provided with support rollers 10 which bear against the drum 6. FIGS. 14 to 17 show various designs of such support rollers, with FIG. 14 illustrating a support drum 30 which is mounted on a shaft 29 and allows radial movements at slight surface pressure onto the drum body 21. FIG. 15 shows spaced rollers 31 mounted on the shaft 29 which allow radial and slight axial movements on the drum body 21. FIGS. 16 and 17 show rollers in form of spheres 33 which are attached in a mounting 32 and allow optimum radial and axial movements as well as exertion of a slight surface pressure onto the drum body 21, depending on their size.

Figure 18:
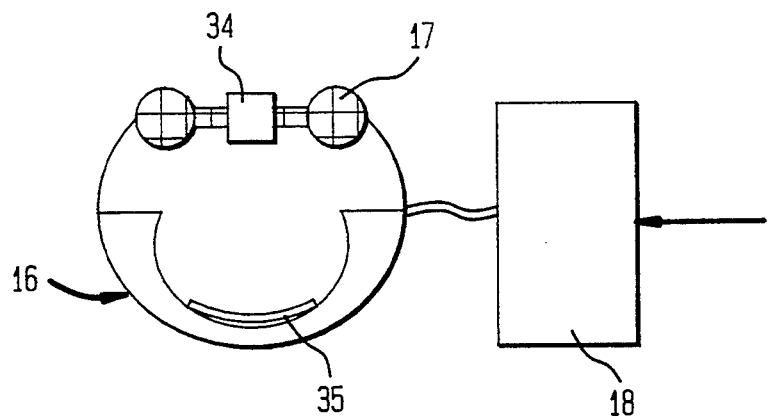
FIG. 18 is a schematic sectional view of a variation of the apparatus shown in FIG. 10.

A variation of the heating collar 16 shown in FIG. 10 is illustrated in FIG. 18. The clamp 17 for securely tightening the collar 16 around the drum body 21 in the area of the patch 15 is acted upon by a pneumatically or hydraulically operated adjusting element 34 which is part of the computerized control unit and allows a precise setting of the tension or clamping force of the clamp 17.

As further shown in FIG. 18, the heating collar 16 may contain adapter inlays 35 for use of the collar 16 with drums of different diameter.

It will be appreciated by persons skilled in the art that the apparatus must contain further elements which do not appear in the foregoing drawings. For example, in order to ensure the quality of the repair, the treatment station contains suitable measuring elements by which e.g. the material type of the coating, the material hardness or the surface finish of the material are determined and transmitted in form of signals to the computerized control unit for processing and control of e.g. the actuator 34 to exert a precise pressure or precise temperature for the hot vulcanization step or hot pressing step. However, these elements, like much other necessary elements, are not part of the present invention, and have been omitted from the Figures for the sake of simplicity.

The raw material for vulcanization corresponds to the coating 20 and can be prepared or cut in various shapes, such as circular, square, rectangular or as band or cord, in dependence on prevailing conditions. Suitably, the raw materials are vacuum-packed as are the ceramic compounds used for the repair.

The treatment station 4 may be provided with a not shown vacuum bell which is connected to a vacuum pump for covering and evacuating the patch 15 in form of a paste-like compound e.g. ceramic. In this manner, undesired reactions of the mended area during operation through otherwise existing air pockets are eliminated. Suitably, the evacuation is carried out before a curing or hardening of the patch 15.

While the invention has been illustrated and described as embodied in an apparatus for and method of restoring a damaged area of a coating of a drum, it is not intended to be limited to the details shown since various modifications and structural changes may be made without departing in any way from the spirit of the present invention.

What is claimed as new and desired to be protected by Letters Patent is set forth in the appended claims:

I claim:

1. Apparatus for restoring a damaged area of a coating on a drum body, comprising a treatment station having a frame, coating-removal means supported by said frame for mechanically freeing the damaged area from remaining coating, cleaning means supported by said frame for cleaning the freed damaged area, bonding means supported by said frame for uniting a patch inserted in the damaged area with neighboring coating material through hot vulcanization or hot pressing, with the patch having a material composition corresponding to the coating material, and mechanical finishing means supported by said frame for surface finishing the restored coating.

2. Apparatus as defined in claim 1, and further comprising a vacuum bell mounted to said treatment station for surrounding said patch before curing.

3. Apparatus as defined in claim 1, and further comprising a computerized control means for controlling functions of said treatment station.

4. Apparatus as defined in claim 1 wherein said frame has support posts having one end mounted to said frame and another end in form of spherical support rollers.

5. Apparatus as defined in claim 4, and further comprising a mounting for securing said support rollers.

6. Apparatus as defined in claim 1 wherein said bonding means includes a heating collar enclosing the drum body in the area of said patch, and further comprising adapters for allowing adaptation of said heating collar to a size of the drum body.

7. Apparatus as defined in claim 6 wherein said bonding means includes a clamp for tensioning said heating collar, and an adjusting element for hydraulically or pneumatically actuating said clamp.

8. Apparatus as defined in claim 1 wherein said treatment station is an integral part of a treatment plant for treating material webs.

9. Apparatus as defined in claim 8 wherein said treatment plant has a treatment station for each drum.

10. Apparatus as defined in claim 8 wherein said cleaning means includes a corona electrode and a generator for supplying said corona electrode with high voltage, said corona electrode treating the freed damaged area and, optionally, the restored coating area including neighboring coating material.

11. Apparatus as defined in claim 10 wherein said corona electrode is connectable to said generator of said treatment plant.

12. Apparatus as defined in claim 8 wherein said treatment plant accommodates said treatment station for corona treatment of a material web.

13. Apparatus as defined in claim 12 wherein said frame includes stationary guide bars for allowing displacement of said treatment station along said guide bars.

* * * * *